United States Patent
Holihan et al.

(10) Patent No.: US 8,973,701 B2
(45) Date of Patent: Mar. 10, 2015

(54) ASSEMBLY FOR SELECTIVELY CONNECTING A SHIFTER TO THE STEERING WHEEL OR STEERING COLUMN

(71) Applicant: GM Global Technology Operations LLC, Detroit, MI (US)

(72) Inventors: Kyle Holihan, South Lyon, MI (US); Charles M. Tomlinson, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/950,789

(22) Filed: Jul. 25, 2013

(65) Prior Publication Data

US 2015/0027260 A1    Jan. 29, 2015

(51) Int. Cl.
*B60K 20/06* (2006.01)
*F16H 59/02* (2006.01)
*B62D 1/16* (2006.01)

(52) U.S. Cl.
CPC .............. *B62D 1/16* (2013.01); *F16H 59/0278* (2013.01)
USPC ............................ 180/336; 74/552; 74/473.31

(58) Field of Classification Search
CPC .......... B60K 20/06; F16H 59/02; F16H 59/04; F16H 2059/0247
USPC ........ 180/336; 74/473.31, 473.32, 552, 484 R
See application file for complete search history.

(56) References Cited

U.S. PATENT DOCUMENTS

| | | | |
|---|---|---|---|
| 5,161,422 A * | 11/1992 | Suman et al. | 74/335 |
| 7,278,510 B1 * | 10/2007 | Richards | 180/336 |
| 7,845,457 B2 * | 12/2010 | Baluch et al. | 180/336 |
| 2007/0004549 A1 * | 1/2007 | Chryssochoos et al. | 475/149 |
| 2012/0144947 A1 * | 6/2012 | Herbert et al. | 74/473.31 |

* cited by examiner

*Primary Examiner* — Ruth Ilan
(74) *Attorney, Agent, or Firm* — Quinn Law Group, PLLC (57) ABSTRACT

An assembly includes a steering column, a steering wheel coupled to the steering column, and a shifter coupled between the steering column and the steering wheel. The shifter includes a shifter body and a shift actuator movably coupled to the shifter body. The assembly further includes a coupler movable through the shifter body between a first coupler position and a second coupler position. The coupler is configured to couple the shifter body to the steering wheel when the coupler is in the first coupler position to permit the shift actuators to rotate along with the steering wheel. The coupler is configured to couple the shifter to the steering column when the coupler is in the second coupler position to maintain the shifter body stationary relative to the steering wheel.

20 Claims, 3 Drawing Sheets

ASSEMBLY FOR SELECTIVELY CONNECTING A SHIFTER TO THE STEERING WHEEL OR STEERING COLUMN

TECHNICAL FIELD

The present disclosure relates to assemblies, system, and methods for selectively coupling a shifter, such as a paddle shifter, to a steering wheel or a steering column.

BACKGROUND

Some vehicles include a semi-automatic transmission that allows a driver to operate the vehicle in an automatic mode and a manual mode. In the automatic mode, the vehicle can shift gears automatically without the direction of the driver. In the manual mode, the semi-automatic transmission allows drivers to choose a desired gear sequentially using a shifter such as a gearshift lever or a paddle shifter. Paddle shifters may be coupled to the steering wheel of the vehicle.

SUMMARY

The present disclosure relates to assemblies for selectively connecting a shifter to a steering wheel or a steering column. In an embodiment, the assembly includes a steering column, a steering wheel coupled to the steering column, and a shifter coupled between the steering column and the steering wheel. The shifter includes a shifter body and a shift actuator movably coupled to the shifter body. The assembly further includes a coupler movably through the shifter body between a first coupler position and a second coupler position. The coupler is configured to couple the shifter body to the steering wheel when the coupler is in the first coupler position to permit the shift actuator to rotate along with the steering wheel. The coupler is configured to couple the shifter body to the steering column when the coupler is in the second coupler position to maintain the shifter body stationary relative to the steering wheel.

In an embodiment, the shifter body is decoupled from the steering column when the coupler is in the first coupler position. The shifter body is decoupled from the steering wheel when the coupler is in the second coupler position. The coupler includes a coupling pin slidably coupled to the shifter body. The coupler includes a handle extending from the coupling pin. The shifter body may be an outer shifter body, and the shifter may further include an inner shifter body fixed to the steering column. The outer shifter body is configured to rotate about the inner shifter body. The assembly may further include an electrical connection assembly configured to transmit electrical signals between the outer shifter body and the inner shifter body. The electrical connection assembly may include a wireless signal transmitter disposed in the outer shifter body and a wireless signal receiver disposed in the inner shifter body. The wireless signal receiver is configured to receive signals transmitted by the wireless signal transmitter. The electrical connection assembly may include a plurality of electrical conductors disposed between the inner shifter body and the outer shifter body. The electrical conductors are configured to transmit electrical signals between the outer shifter body and the inner shifter body even when the outer shifter body rotates along with the steering wheel. At least one of the electrical conductors is an electrically conductive ball. At least one of the electrical conductors is an electric brush.

The present disclosure also relates to vehicles such as cars and trucks. In an embodiment, the vehicle includes a steering column defining a column hole and a steering wheel coupled to the steering column. The steering wheel defines a wheel hole and is configured to rotate relative to the steering column about a first axis. The vehicle further includes a paddle shifter coupled between the steering column and the steering wheel. The paddle shifter includes a shifter body and a paddle pivotally coupled to the shifter body. The paddle shifter defines a shifter body hole extending through the shifter body. The shifter body hole is elongated along a second axis. The second axis is parallel to the first axis. The vehicle further includes a coupling pin slidably disposed in the shifter body hole. The coupling pin is configured to move along the shifter body hole between a first pin position and a second pin position. The coupling pin is partly positioned in the wheel hole when the coupling pin is in the first pin position and couples the shifter body to the steering wheel in order to permit the paddle to rotate along with steering wheel. The coupling pin is partly positioned in the column hole when the coupling pin is in the second pin position and couples the shifter body to the steering column in order to maintain the paddle stationary relative to the steering column.

In an embodiment of the vehicle, the shifter body is decoupled from the steering column when the coupling pin is in the first pin position. The shifter body is decoupled from the steering wheel when the coupling pin is in the second pin position. The vehicle further includes comprising a handle extending from the coupling pin. The shifter body may be an outer shifter body, and the paddle shifter further comprises an inner shifter body fixed to the steering column. The outer shifter body is configured to rotate about the inner shifter body. The vehicle may further include an electrical connection assembly configured to transmit electrical signals between the outer shifter body and the inner shifter body. The electrical connection assembly may include a wireless signal transmitter disposed in the outer shifter body and a wireless signal receiver disposed in the inner shifter body. The wireless signal receiver is configured to receive signals transmitted by the wireless signal transmitter. The electrical connection assembly may include a plurality of electrical conductors disposed between the inner shifter body and the outer shifter body. The electrical conductors are configured to transmit electrical signals between the outer shifter body and the inner shifter body even when the outer shifter body rotates along with the steering wheel. At least one of the electrical conductors may be an electrically conductive ball.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
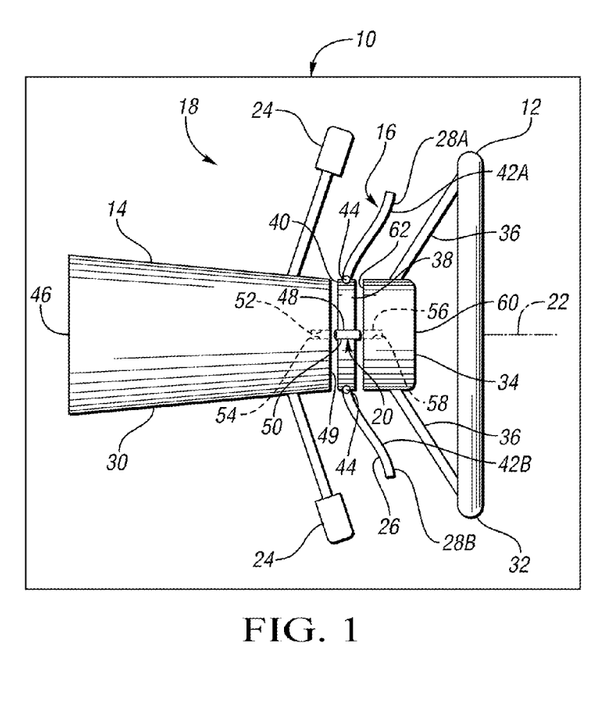
FIG. 1 is a schematic side view of a portion of a vehicle including a steering wheel, a steering column, a shifter, and a coupler configured to selectively couple the shifter to the steering wheel or steering column.

Referring to the drawings, wherein like reference numerals are used to identify like or identical components in the various views, FIG. 1 schematically illustrates a vehicle 10 including a steering wheel 12, a steering column 14, and a shifter 16 disposed between the steering wheel 12 and the steering column 14. The steering wheel 12, the steering column 14, and the shifter 16 may be collectively referred to as an assembly 18.

The steering wheel 12 can be rotationally coupled to the steering column 14. As such, the steering wheel 12 can rotate about a first axis 22. The steering wheel 12 is operatively coupled to the wheels (not shown) of the vehicle 10 and, consequently, turning the steering wheel 12 relative to the steering column 14 about the first axis 22 causes the wheels to turn in a desired direction. The steering wheel 12 may include a steering wheel rim 32, a steering wheel hub or body 34, and one or more spokes 36 interconnecting the steering wheel rim 32 and the steering wheel body 34. The steering wheel body 34 defines a first body edge portion 60 and a second body edge portion 62 opposite the first body edge portion 60. The second body edge portion 62 may be monolithically formed with the steering wheel body 34. Alternatively, the second body edge portion 62 may be a discrete component, such as a disc, attached to the steering wheel body 34. The first body edge portion 60 may be closer to the steering wheel 32 than the second body edge portion 62. The steering wheel body 34 may be closer to the steering column 14 than the steering wheel rim 32.

The steering column 14 remains stationary while the steering wheel 14 rotates about the first axis 22 and may include a substantially frusto-conical column body 30 and one or more column actuators 24 extending from the column body 30. The column actuators 24 may be configured to actuate other features of the vehicle 10 such as signal lights or wipers. The column body 30 defines a first column edge portion 46 attached to another portion of the vehicle 10 and a second column edge portion 49 opposite to the first column edge portion 46. The second column edge portion 49 may be monolithically formed with the column body 30. Alternatively, the second column edge portion 49 may be a discrete part, such as a disc, attached to the column body 30.

The shifter 16 may be configured as a paddle shifter 26 and is operatively coupled to a transmission (not shown) of the vehicle 10, such as semi-automatic transmission, and allows a driver to choose a desired transmission gear. In the depicted embodiment, the shifter 16 is located between the steering column 14 and the steering wheel 12 and includes one or more shift actuators 28A, 28B capable of being actuated by a driver. Actuating one of the shift actuators 28A, 28B causes the vehicle transmission to shift gears.

In the depicted embodiment, the shifter 16 includes an outer shifter body 38, a first or upshift shift actuator 28A, and a second or downshift shift actuator 28B. The outer shifter body 38 may have a substantially annular shape and may be a slip ring 40. The first shift actuator 28A may be a paddle 42A (i.e., a first paddle) and is movable coupled to the outer shifter body 38. In operation, the vehicle transmission (not shown) shifts to a higher gear each time a driver actuates the first shift actuator 28A. For example, a pivot pin 44 or any other suitable coupler may pivotally couple the first shift actuator 28A to the outer shifter body 38. Hence, the driver may pull or push the first shift actuator 28A to pivot the first shift actuator 28A relative to the outer shifter body 38, causing the vehicle transmission (not shown) to shift to a higher gear. The second shift actuator 28B may also be configured as a paddle 42B (i.e., a second paddle) and is movably coupled to the outer shifter body 38. In operation, the vehicle transmission (not shown) shifts to a lower gear each time a driver actuates the second shift actuator 28B. A pivot pin 44 or any other suitable coupler may pivotally couple the second shift actuator 28B to the outer shifter body 38. The driver can therefore pull or push the second shift actuator 28B to pivot the second shift actuator 28B, causing the vehicle transmission (not shown) to shift to a lower gear. The outer shifter body 38 may also be referred to as a shifter body.

Figure 2A:
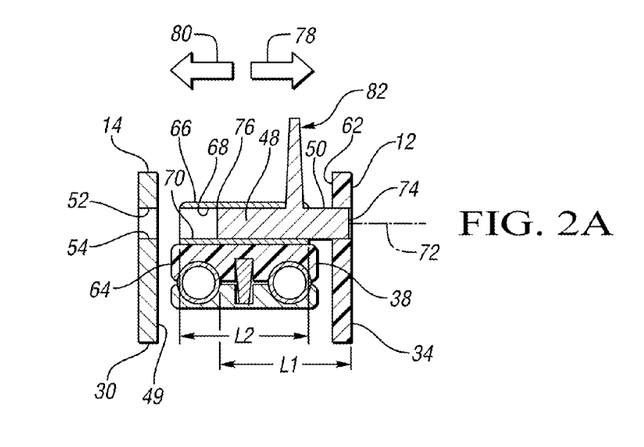
FIG. 2A is a schematic, cross-sectional side view of portions of the steering wheel, steering column, shifter, and coupler shown in FIG. 1, depicting the coupler connecting the shifter to the steering wheel.
Figure 2B:
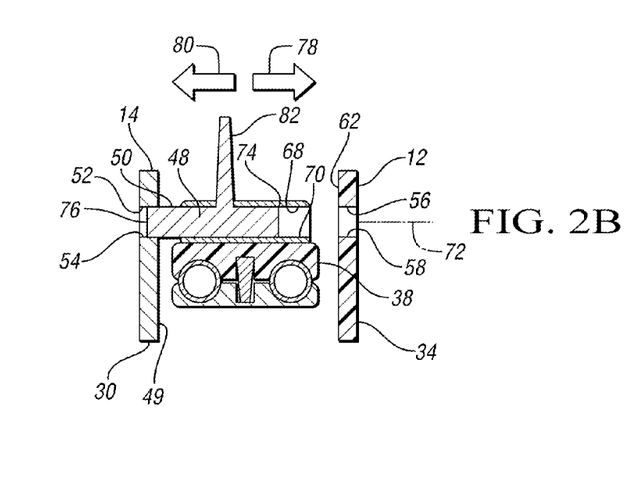
FIG. 2B is a schematic, cross-sectional side view of portions of the steering wheel, steering column, shifter, and coupler shown in FIG. 1, depicting the coupler connecting the shifter to the steering column.
Figure 3A:
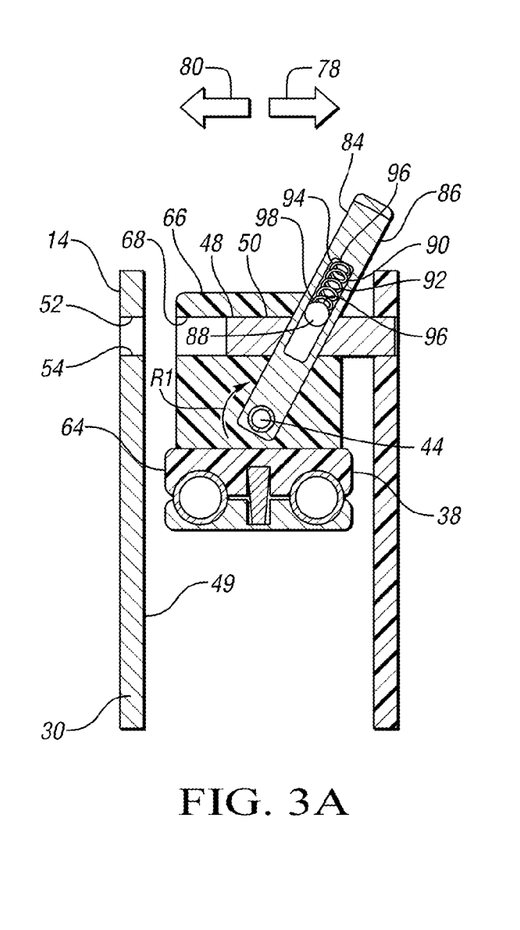
FIG. 3A is a schematic, cross-sectional side view of portions of the steering wheel, steering column, and shifter shown in FIG. 1, and a coupler in accordance with another embodiment of the present disclosure, wherein the coupler is connecting the shifter to the steering wheel.
Figure 3B:
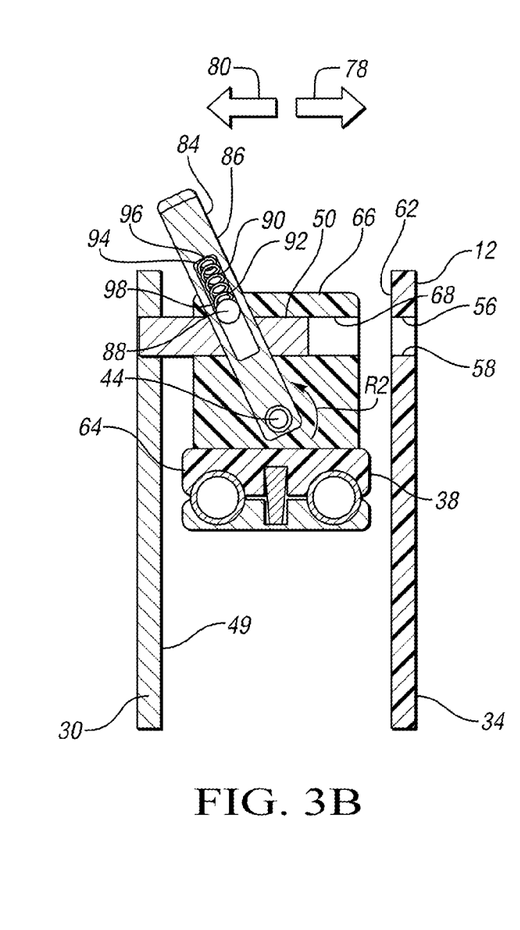
FIG. 3B is a schematic, cross-sectional side view of portions of the steering wheel, steering column, and shifter shown in FIG. 1, and the coupler of FIG. 3A, wherein the coupler is connecting the shifter to the steering column.

With reference to FIGS. 1-3, the assembly 18 further includes a coupling mechanism 20 for selectively coupling the outer shifter body 38 of the shifter 16 to the steering wheel 12 or the steering column 14. The coupling mechanism 20 therefore allows a driver to change the position of the shifter 16 relative to the steering wheel 12. Specifically, the coupling mechanism 20 allows the outer shifter body 38 of the shifter 16 to be coupled to the steering wheel 12 (and decoupled from the steering column 14) in order to the permit the outer shifter body 38 and the shift actuators 28A, 28B of the shifter 16 to rotate about the first axis 22 along with the steering wheel 12. Additionally, the coupling mechanism 20 allows the outer shifter body 38 of the shifter 16 to be coupled to the steering column 14 (and decoupled from the steering wheel 12), thus permitting the outer shifter body 38 and the shift actuators 28A, 28B of the shifter 16 to remain stationary relative to the steering column 14 while the steering wheel 12 is turned about the first axis 22. It is desirable to provide drivers with the option between fixing the shift actuators 28A, 28B of the shifter 16 to the steering column 14 or to the steering wheel 12 in order to allow the driver to adjust their driving style based on preference or driving conditions. For example, a conventional driver driving in an urban setting may prefer the convenience of having the shift actuators 28A, 28B move with the steering wheel 12 because driving in an urban setting typically involves turning the steering wheel 12 at relatively small angles. Racing drivers, on the other hand, may prefer having the shift actuators 28A, 28B at a fixed location with respect to the steering wheel 12 to avoid the need to look for the shift actuators 28A, 28B of the shifter 16 during a race. Hence, racing drivers may prefer that the shift actuators 28A, 28B remain stationary relative to the steering wheel 12. It is therefore desirable to develop a mechanism, such as the coupling mechanism 20, capable of selectively coupling the shifter 16 to the steering wheel 12 or the steering column 14.

With continued reference to FIGS. 1-3, the coupling mechanism 20 may be part of the assembly 18 and can selectively couple at least a portion of the shifter 16 to the steering wheel 12 or the steering column 14. When the outer shifter body 38 of the shifter 16 is coupled to the steering wheel 12, the outer shifter body 38 and the shift actuators 28A, 28B can rotate concomitantly with the steering wheel 12 about the first axis 22. When the outer shifter body 38 of the shifter 16 is coupled to the steering column 14, the outer shifter body 38 and the shifter actuators 28A, 27B do not rotate with the steering wheel 12 but rather remain stationary relative to the steering column 14. In the depicted embodiment, the coupling mechanism 20 includes a coupler 48 configured to selectively couple the outer shifter body 38 of the shifter 16 to the steering wheel 12 or the steering column 14. However, the coupler 48 may not be able to interconnect the steering wheel 12 and the steering column 14.

The coupler 48 can move through or along the outer shifter body 38 between a first coupler position (FIG. 2A) and a second coupler position (FIG. 2B). In the first coupler position (FIG. 2A), the coupler 48 connects the steering wheel 12 to the outer shifter body 38 of the shifter 16, and the steering column 14 is decoupled from the outer shifter body 38 of the shifter 16. In the second coupler position, the coupler 48 connects the steering column 14 to the outer shifter body 38 of the shifter 16, and the steering wheel 12 is decoupled from the outer shifter body 38 of the shifter 16.

With reference to FIGS. 2A and 2B, the coupler 48 may include a coupling pin 50 slidably coupled to the outer shifter body 38 and can therefore slide between the steering column 14 and the steering wheel 12. The steering column 14 includes an inner column surface 54 defining a column hole or socket 52. The column hole 52 extends into the second column edge portion 49 of the column body 30 and is configured, shaped, and sized to receive a portion of the coupling pin 50 in order to couple the outer shifter body 38 to the steering column 14. The steering wheel body 34 of the steering wheel 12 includes an inner wheel surface 56 defining a wheel hole or socket 58. The wheel hole 58 extends into the second body edge portion 62 of the steering wheel body or hub 34 and is configured, shaped, and sized to receive a portion of the coupling pin 50 in order to couple the outer shifter body 38 to the steering wheel 12.

The outer shifter body 38 may include an inner body portion 64 and an outer body portion 66. The inner body portion 64 is disposed radially inward with respect to the outer body portion 66. Thus, the outer body portion 66 extends along the outer perimeter of the outer shifter body 38. The outer shifter body 38 includes a first inner body surface 68 defining a shifter body hole 70. The shifter body hole 70 is elongated along a second axis 72 and extends through a portion of the outer shifter body 38. For example, the shifter body hole 70 may extend through the outer body portion 66 and may be substantially aligned with the column hole or socket 52 and the wheel hole 58 along the second axis 72. The second axis 72 may be substantially parallel to the first axis 22. The shifter body hole 70 may be configured as a slot, a slit, a channel, or any suitable opening capable of receiving at least a portion of the coupler 48 such as the coupling pin 50.

The coupling pin 50 is movably coupled to the outer body portion 66 of the outer shifter body 38. For instance, the coupling pin 50 can be configured to slide through the shifter body hole 70 between a first pin position (FIG. 2A) and a second pin position (FIG. 2B) as discussed in detail below. The coupling pin 50 may be elongated along the second axis 72 and includes a first pin end portion 74 and a second pin end portion 76 opposite the first pin end portion 76. The first pin end portion 74 is configured, shaped, and sized to mate with the column hole 52 so as to couple the outer shifter body 38 of the shifter 16 to the steering wheel 12. For instance, the first pin end portion 74 may have a tapered shape, and the column hole 52 may have a corresponding tapered shape. The second pin end portion 76 is configured, shaped, and sized to mate with the column hole 52 so as to couple the outer shifter body 38 of the shifter 16 to the steering column 14. For example, the second pin end portion 76 may have a tapered shape, and the column hole 52 may have a corresponding tapered shape.

The coupling pin 50 may be configured, shaped, and sized to slide through the shifter body hole 70 along a first direction indicated by arrow 78 and an opposite second direction indicated by arrow 80. The coupler 48 may include a coupling handle 82 for facilitating the driver to move the coupling pin 50 in the first direction indicated by arrow 78 or the second direction indicated by arrow 80. The coupling handle 82 may be configured as a lever or arm extending from the coupling pin 50 a direction substantially perpendicular to the second axis 72.

The coupling pin 50 defines a pin dimension L1, such as a pin length, and the outer body portion 66 defines a body dimension L2, such as a body width. The body dimension L2 is greater than the pin dimension L1 to prevent the coupling pin 50 from interconnecting the steering wheel 12 and the steering column 14.

In operation, the driver can move the coupling pin 50 via the coupling handle 82 between the first pin position (FIG. 2A) and the second pin position (FIG. 2B). When the coupling pin 50 is in the first pin position (FIG. 2A), the first pin end portion 74 is disposed in the wheel hole 58, thereby coupling the outer shifter body 38 to the steering wheel 12. As a consequence, the outer shifter body 38 of the shifter 16 can rotate along with the steering wheel 12. In the first pin position (FIG. 2A), the coupling pin 50 does not couple the outer shifter body 38 to the steering column 14. Accordingly, the outer shifter body 38 of the shifter 16 can rotate while the steering column 14 remains stationary when the coupling pin 50 is in the first pin position. When the coupling pin 50 is in the second pin position (FIG. 2B), the second pin end portion 76 is disposed in the column hole 52, thereby coupling the outer shifter body 38 of the shifter 16 to the steering column 14. Consequently, the outer shifter body 38 remains stationary along with the steering column 14 while the steering wheel 12 can rotate about the first axis 22 relative to the steering column 14 and the outer shifter body 38.

With reference to FIGS. 3A and 3B, in another embodiment, the coupler 48 may include an over-center mechanism 84 configured to move the coupling pin 50 toward the wheel hole 58 or the column hole 52. The over-center mechanism 84 includes a handle 86, such as an arm, pivotally coupled to a portion of the outer shifter body 38, such as the outer body portion 66, via a pivot pin 44 or any other suitable coupling. Accordingly, the handle 86 can pivot relative to the outer shifter body 38 about the pivot pin 44 in first rotational direction R1 and a second rotational direction R2 opposite to the first rotational direction R1. The over-center mechanism 84 further includes a biasing member 90, such as a tension coil spring 92, and a load pin 88 interconnecting the coupling pin 50 and the biasing member 90. The biasing member 90 includes a first biasing member end 94 attached to a portion of the handle 86, such as an inner handle surface 96, and a second biasing member end 98 attached to the load pin 88. The load pin 88 attached to the coupling pin 50 and is configured to receive a load from the biasing member 90.

In operation, pivoting the handle 86 in the first rotational direction indicated by arrow R1 causes the coupling pin 50 to move in the first direction indicated by arrow 78 toward the wheel hole 58. While the handle 86 pivots in the first rotational direction indicated by arrow R1, the biasing member 90 eventually biases the coupling pin 50 toward the wheel hole 58. Once the coupling pin 50 is in the first pin position (FIG. 3A), the biasing member 90 exerts a biasing force on the coupling pin 50 that maintains the coupling pin 50 in the first pin position. The handle 86 can be pivoted in the second rotational direction indicated by arrow R2 in order to move the coupling pin 50 in the second direction indicated by arrow 80 toward the column hole 52. While the handle 86 is pivoting in the second rotational direction indicated by arrow R2, the biasing member 90 may eventually bias the coupling pin 50 toward the column hole 52. Once the coupling pin 50 is in the second pin position (FIG. 3B), the biasing member 90 exerts a biasing force on the coupling pin 50 that maintains the coupling pin 50 in the second pin position.

Figure 4:
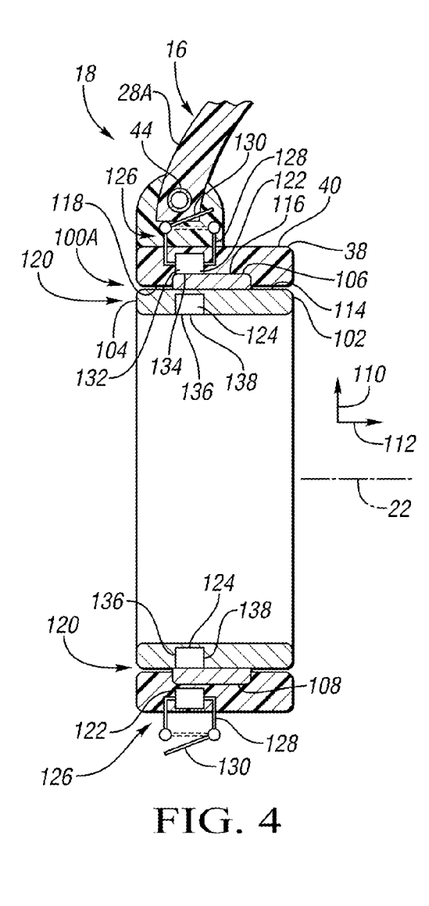
FIG. 4 is a schematic, cross-sectional side view of a portion of the shifter shown in FIG. 1, illustrating a wireless electrical connection interface electrically connecting outer and inner shift bodies of the shifter.
Figure 5:
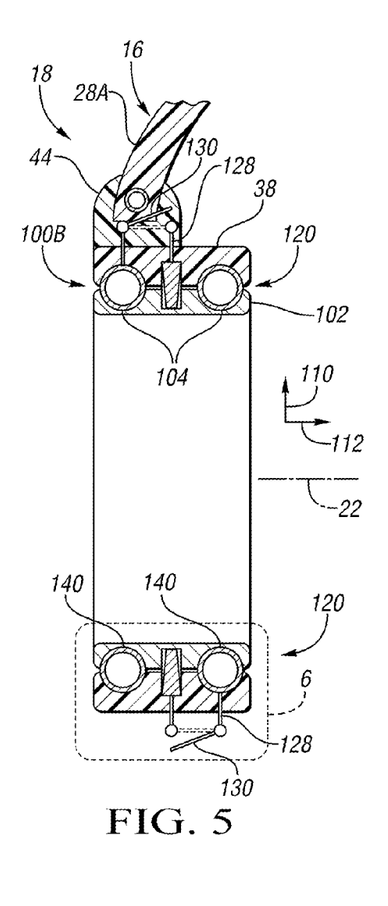
FIG. 5 is a schematic, cross-sectional side view of a portion of the shifter shown in FIG. 1, illustrating a wired electrical connection interface electrically connecting outer and inner shift bodies of the shifter.

With reference to FIGS. 4 and 5, the shifter 16 further includes an inner shifter body 102 fixed to the steering column 14 (FIG. 1). As such, the inner shifter body 102 remains stationary relative to the steering column 14 even when the coupling mechanism 20 couples the outer shifter body 30 to the steering wheel 12 (FIG. 1). Hence, the inner shifter body 102 remains stationary relative to the steering wheel 12 (FIG. 1) while the outer shifter body 38 can rotate about the first axis 22 (FIG. 1) when the coupler 48 connects the steering wheel 12 to the outer shifter body 38. The inner shifter body 102 may have a substantially annular shape and may therefore be configured as an inner ring 104. The inner shifter body 102 may also be referred to as the inner ring harness connector.

The shifter 16 additionally includes a shift coupling 106 configured to movably couple to the inner shifter body 102 to the outer shifter body 38. As a result, the shift coupling 106 allows the outer shifter body 38 to rotate relative to the inner shifter body 102 about the first axis 22 while preventing, or at least inhibiting, the inner shifter body 102 from moving in a third or radial direction as indicated by arrow 110 or a fourth or axial direction indicated by arrow 112. The third direction indicated by arrow 110 may be substantially perpendicular to the fourth direction indicated by arrow 112.

The shift coupling 106 may be a coupling ring 108 connected to (or monolithically formed with) the inner shifter body 102. Specifically, the coupling ring 108 may be disposed around an outer perimeter surface 114 of the inner ring 104 and is configured, shaped, and sized to be slidably received in a coupling track 116, such as a channel or groove, defined by a second inner body surface 118 of the outer shifter body 38. Accordingly, the coupling ring 108 can serves as a guide to allow the outer shifter body 38 to slide relative to the inner shifter body 102, thus allowing the slip ring 40 to rotate about the inner ring 104. The coupling ring 108 can be configured as one or more lubricated ridges configured, shaped, and sized to slidably mate with the coupling track 116.

The shifter 16 further includes an electrical connection assembly 100A, such as an electrical switch signal interface, configured to transmit signals, such as electrical signals, between the outer shifter body 38 (e.g., the slip ring 40) and the inner shifter body 102 (e.g., inner ring 104). The electrical signals can then be transmitted to another component of the vehicle 10 such an airbag coil (not shown) disposed within the inner shifter body 102. The electrical connection assembly 100A can transmit electrical signals between the outer shifter body 38 and the inner shifter body 102 via direct physical contact among electrical connectors or via any suitable non-contact wireless transmission system.

In the embodiment depicted in FIG. 4, the electrical connection assembly 100A may include one or more non-contact wireless transmission systems 120 configured to transmit wireless signals between the outer shifter body 38 and the inner shifter body 102. As used herein, the term "wireless signals" includes, but is not limited to, signals that are part of the electromagnetic spectrum such as infrared, radiofrequency, etc. Each shift actuator 28A, 28B is operatively associated with at least one non-contact wireless transmission system 120. In the depicted embodiment, the first shift actuator 28A is operatively associated with one non-contact wireless transmission system 120, and the second shift actuator 28B (FIG. 1) is operatively associated with another non-contact wireless transmission system 120. Although the drawings show two non-contact wireless transmission systems 120, the shifter 16 may include more or fewer non-contact wireless transmission systems 120.

Each wireless transmission system 120 includes a first wireless interface module 122 configured to transmit a wireless signal and a second wireless interface module 124 configured to receive a wireless signal. However, the electrical connection assembly 100A may include two first wireless interface modules 122 (each associated with one shift actuator 28A or 28B) and one second wireless interface module 124 configured to receive wireless signals from the two first wireless interface modules 122. The second wireless interface module 124 may be positioned within the inner shifter body 102 or along the entire perimeter (e.g., circumference) of the inner shifter body 102 in order to allow the second wireless interface module 124 to receive wireless signals from the first wireless interface module 122 regardless of the position of the outer shifter body 38 relative to the steering column 14. Accordingly, even when the outer shifter body 38 and the shift actuators 28A, 28B rotates along with the steering wheel 12 (FIG. 1), the second wireless interface module 124 can receive wireless signals from the first wireless modules 124 irrespective of the position of the outer shifter body 38 relative to the inner shifter body 102 because the second wireless module 124 is disposed along the entire perimeter (e.g., circumference) of the inner shifter body 102. The second wireless module 124 does not have to be a single one-piece component; rather, the second wireless module 124 may be several discrete electrically interconnected components.

Each of the first wireless interface modules 122 is at least partly disposed inside the outer shifter body 38 and may be configured as a transmitter circuit 126 including electrical wiring 128, an electrical switch 130, and a wireless signal transmitter 132 such as a radiofrequency (RF) switch signal transmitter 134. The RF switch signal transmitter 134 is configured to transmit RF signals. The electrical switch 130 is movably connected to the shift actuator 28A or 28B. Accordingly, pivoting the shift actuator 28A or 28B relative to the outer shifter body 38 (or any other type of actuation) causes the electrical switch 130 to move between an open position and a closed position (shown in phantom). In the open position, the electrical switch 130 breaks the transmitter circuit 126 and thus no wireless signal is transmitted to the second wireless interface module 124. In the closed position, the electrical switch 130 allows electricity to flow through the transmitter circuit 126, thereby allowing the wireless signal transmitter 132 to transmit a wireless signal, such as an RF signal, to the second wireless interface module 124.

Each of the second wireless interface modules 124 is at least partly disposed inside the inner shifter body 102 and may be configured as an electrical circuit. Regardless of its configuration, the second wireless interface module 124 is configured to receive wireless signals transmitted from the first wireless interface module 122 and includes a wireless signal receiver 136 and an inductive charger (not shown). The wireless signal receiver 136 is configured to receive wireless signals and may be an RF switch signal receiver 138 configured to receive RF signals. Moreover, the wireless signal receiver 136 may be inductively charged by an inner ring charger (not shown) when the vehicle 10 is driving in a predetermined direction (e.g., straight ahead).

Figure 6:
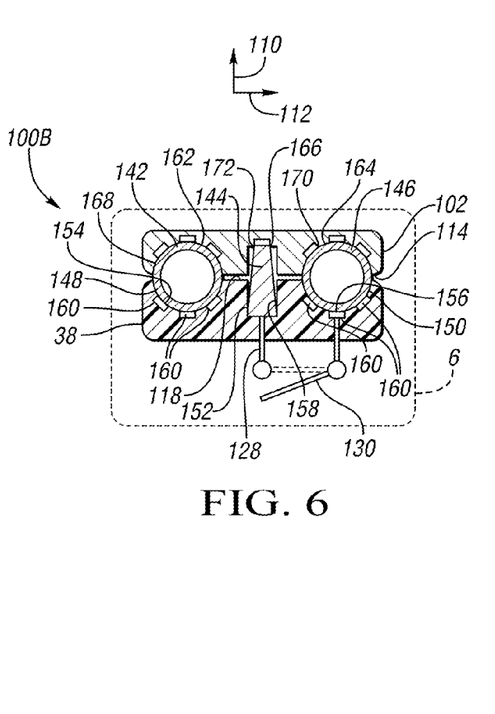
FIG. 6 is an enlarged schematic, cross-sectional side view of a portion of the shifter shown in FIG. 1, taken around section 6 of FIG. 5.

With reference to FIGS. 5 and 6, the shifter 16 may include one or more electrical connection assemblies 1 OOB in accordance with another embodiment of the present disclosure. The electrical connection assembly 100B is configured to transmit electrical signals between the outer shifter body 38 and the inner shifter body 102 via physical contact of electrically conductive elements as described in detail below. In particular, the electrical connection assembly 100B can transmit electrical signals between the outer shifter body 38 and the inner shifter body 102 regardless of the position of the outer shifter body 38 relative to the inner shifter body 102. Thus, even when the outer shifter body 38 and the shift actuators 28A, 28B are rotating along with the steering wheel 12 (FIG. 1), the electrical connection assembly 100B can transmit electrical signals between the outer shifter body 38 and the inner shifter body 102.

With reference to FIG. 5, the electrical connection assembly 100B includes electrical wiring 128 and electrical switches 130 electrically connected to the electrical wiring 128. The electrical wiring 128 and the electrical switch 130 are disposed along or within the outer shifter body 38 and can therefore rotate with the outer shifter body 30 when the outer shifter body 38 rotates relative to the inner shifter body 102. Each electrical switch 130 is operatively connected to one of the shift actuators 28A or 28B. As such, pivoting the shift actuator 28A, 28B relative to the outer shifter body 38 (or any other actuation) causes the corresponding electrical switch 130 to move between the open position and the closed position. When the electrical switch 130 is in the open position, electrical signals cannot be transmitted between the outer shifter body 38 and the inner shifter body 102. When the electrical switch 130 is in the closed position (shown in dashed lines), electrical signals can be transmitted between the outer shifter body 38 and the inner shifter body 102.

With continued reference to FIG. 5, the electrical connection assembly 100B further includes a plurality of electrical conductors 140 electrically connected to the electrical switches 130 and the electrical wiring 128. The electrical conductors 140 are wholly or partly made of an electrically conductive material and can be coupled to the outer shifter body 38. Accordingly, the electrical conductors 140 can transmit electrical signals between the outer shifter body 38 to the inner shifter body 102 even when the outer shifter body 38 is rotating relative to the inner shifter body 102. Alternatively, the electrical conductors 140 are disposed between the outer shifter body 38 and the inner shifter body 102 and along the entire outer perimeter (e.g., circumference) of the inner shifter body 102, thereby allowing transmission of electrical signals between the outer shifter body 38 and the inner shifter body 102 irrespective of the position of the outer shifter body 38 relative to the inner shifter body 102. In the depicted embodiment, at least one electrical conductor 140 servers as a ground connection or common return path for electric current, another electrical conductor is electrically connected to the electrical switch 130 operatively coupled to the first shift actuator 28A, and another electrical conductor 140 is electrically connected to the electrical switch 130 operatively coupled to the second shift actuator 28B (FIG. 1). The electrical conductors 140 may be balls, brushes, or any other electrical conductor suitable to serve as an electrical switch signal interface. In addition, the electrical conductors 140 may serve as a coupling configured to prevent, or at least hinder, the inner shifter body 102 from moving in the third or radial direction as indicated by arrow 110 or the fourth or axial direction indicated by arrow 112.

With reference to FIG. 6, in an embodiment, the electrical connection assembly 100B includes one or more first electrically conductive balls 142, one or more electric brush 144, and one or more second electrically conductive balls 146. The first electrically conductive balls 142 are electrically connected to the electrical switch 130 that is operatively coupled to the first shift actuator 28A. The second electrically conductive balls 146 are electrically coupled to the electrical switch 130 that is operatively coupled to the second shift actuator 28B (FIG. 1). The electric brush 144 is electrically connected to the electric wiring 128 and serves as a ground connector or common return path. The first and second electrically conductive balls 142, 146 may minimize the torque required to rotate the outer shifter body 38 relative to the inner shifter body 102. The first electrically conductive balls 142, the electric brush 144, and the second electrically conductive balls 146 may be attached to the outer shifter body 38 and can thus rotate along with the outer shifter body 38 in relation to the inner shifter body 102.

With continued reference to FIG. 6, the second inner body surface 118 of the outer shifter body 38 faces the inner shifter body 102 and includes a first inner surface portion 148 defining a first outer electrical conductor channel or track 154, a second inner surface portion 150 defining a second outer electrical conductor channel or track 156, and a third inner surface portion 152 defining a third outer electrical conductor channel or track 158. The first outer electrical conductor channel 154 and the second outer electrical conductor channel 156 may each have a substantially semi-circular cross-section and are therefore configured, shaped, and sized to receive the first electrically conductive balls 142 and the second electrically conductive balls 146, respectively.

The first outer electrical conductor channel 154 may extend along the entire inner perimeter (e.g., inner circumference) defined by the second inner body surface 118 of the outer shifter body 38 in order to receive a plurality of first electrically conductive balls 142 along the entire perimeter of the outer shifter body 38. The second outer electrical conductor channel 156 may extend along the entire inner perimeter (e.g., inner circumference) defined by the second inner body surface 118 of the outer shifter body 38 in order to receive a plurality of second electrically conductive balls 146 along the entire perimeter of the outer shifter body 38.

The third outer electrical conductor channel 158 may extend along the entire inner perimeter (e.g., inner circumference) defined by the second inner body surface 118 of the outer shifter body 38. Accordingly, the electric brush 144 may extend along the entire inner perimeter (e.g., inner circumference defined by the second inner body surface 118 of the outer shifter body 38). The first outer electrical conductor channel 154, the second outer electrical conductor channel 156, and the third outer electrical conductor channel 158 are spaced apart from each other along the fourth or axial direction indicated by arrow 112.

The electrical connection assembly 100A may further include one or more electrically conductive pads or films 160 disposed along the first inner surface portion 148 and the second inner surface portion 150 of the second inner body surface 118 in order to facilitate electrical connection between the first and second electrically conductive balls 142, 146, respectively, and the electrical wiring 128. The electric brush 144 may be directly connected to the electrical wiring 128.

As discussed above, the inner shifter body 102 includes the outer perimeter surface 114. The outer perimeter surface 114 may include a first outer surface portion 162 defining a first inner electrical conductor channel or track 168, a second outer surface portion 164 defining a second inner electrical conductor channel or track 170, and a third outer surface portion 166 defining a third inner electrical conductor channel or track 172. The first inner electrical conductor channel 168 is substantially aligned with the first outer electrical conductor channel 154 along the third or radial direction as indicated by arrow 110 to receive the first electrically conductive balls 142. Moreover, the first outer electrical conductor channel 154 may have a substantially semi-circular shape and is therefore configured, shaped, and sized to receive the first electrically conductive balls 142. The second inner electrical conductor channel 170 is substantially aligned with the second outer electrical conductor channel 156 along the third or radial direction indicated by arrow 110 to receive the second electrically conductive balls 146. The third inner electrical conductor channel 172 is substantially aligned with the third outer electrical conductor channel 158 to receive the electric brush 144.

One or more electrically conductive pads or films 160 may be disposed along first outer surface portion 162, the second outer surface portion 164, and the third outer surface portion 166. Each of the electrically conducive pads 160 can be in electrical communication with the first electrically conductive balls 142, the second electrically conductive balls 146, the electric brush 144 and another component of the vehicle 10. Further, each electrically conductive pads 160 can transmit electrical signals to that other component of the vehicle 10.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An assembly, comprising:
   a steering column;
   a steering wheel coupled to the steering column;
   a shifter coupled between the steering column and the steering wheel, the shifter including a shifter body and a shift actuator movably coupled to the shifter body;
   a coupler movable through the shifter body between a first coupler position and a second coupler position, wherein the coupler includes a coupling pin slidably coupled to the shifter body and a handle extending from the coupling pin;
   wherein the coupler is configured to couple the shifter body to the steering wheel when the coupler is in the first coupler position to permit the shift actuator to rotate along with the steering wheel; and
   wherein the coupler is configured to couple the shifter body to the steering column when the coupler is in the second coupler position to maintain the shifter body stationary relative to the steering wheel.

2. The assembly of claim 1, wherein the shifter body is decoupled from the steering column when the coupler is in the first coupler position.

3. The assembly of claim 1, wherein the shifter body is decoupled from the steering wheel when the coupler is in the second coupler position.

4. The assembly of claim 1, wherein the shifter body is an outer shifter body and the shifter further comprises an inner shifter body fixed to the steering column, the outer shifter body being configured to rotate about the inner shifter body.

5. The assembly of claim 4, further comprising an electrical connection assembly configured to transmit electrical signals between the outer shifter body and the inner shifter body.

6. The assembly of claim 5, wherein the electrical connection assembly includes a wireless signal transmitter disposed in the outer shifter body and a wireless signal receiver disposed in the inner shifter body, the wireless signal receiver being configured to receive signals transmitted by the wireless signal transmitter.

7. The assembly of claim 5, wherein the electrical connection assembly includes a plurality of electrical conductors disposed between the inner shifter body and the outer shifter body, the electrical conductors being configured to transmit electrical signals between the outer shifter body and the inner shifter body even when the outer shifter body rotates along with the steering wheel.

8. The assembly of claim 7, wherein at least one of the electrical conductors is an electrically conductive ball.

9. The assembly of claim 7, wherein at least one of the electrical conductors is an electric brush.

10. A vehicle, comprising:
    a steering column defining a column hole;
    a steering wheel coupled to the steering column, the steering wheel defining a wheel hole and configured to rotate relative to the steering column about a first axis;
    a paddle shifter coupled between the steering column and the steering wheel, the paddle shifter including a shifter body and a paddle pivotally coupled to the shifter body, the paddle shifter defining a shifter body hole extending through the shifter body, the shifter body hole being elongated along a second axis, the second axis being parallel to the first axis;
    a coupling pin slidably disposed in the shifter body hole, the coupling pin being configured to move along the shifter body hole between a first pin position and a second pin position;
    wherein the coupling pin is partly positioned in the wheel hole when the coupling pin is in the first pin position and couples the shifter body to the steering wheel in order to permit the paddle to rotate along with the steering wheel; and
    wherein the coupling pin is partly positioned in the column hole when the coupling pin is in the second pin position and couples the shifter body to the steering column in order to maintain the paddle stationary relative to the steering column.

11. The vehicle of claim 10, wherein the shifter body is decoupled from the steering column when the coupling pin is in the first pin position.

12. The vehicle of claim 10, wherein the shifter body is decoupled from the steering wheel when the coupling pin is in the second pin position.

13. The vehicle of claim 10, further comprising a handle extending from the coupling pin.

14. The vehicle of claim 10, wherein the shifter body is an outer shifter body and the paddle shifter further comprises an inner shifter body fixed to the steering column, the outer shifter body being configured to rotate about the inner shifter body.

15. The vehicle of claim 14, further comprising an electrical connection assembly configured to transmit electrical signals between the outer shifter body and the inner shifter body.

16. The vehicle of claim 15, wherein the electrical connection assembly includes a wireless signal transmitter disposed in the outer shifter body and a wireless signal receiver disposed in the inner shifter body, the wireless signal receiver being configured to receive signals transmitted by the wireless signal transmitter.

17. The vehicle of claim 15, wherein the electrical connection assembly includes a plurality of electrical conductors disposed between the inner shifter body and the outer shifter body, the electrical conductors being configured to transmit electrical signals between the outer shifter body and the inner shifter body even when the outer shifter body rotates along with the steering wheel.

18. The vehicle of claim 17, wherein at least one of the electrical conductors is an electrically conductive ball.

19. An assembly, comprising:
a steering column;
a steering wheel coupled to the steering column;
a shifter coupled between the steering column and the steering wheel, the shifter including an outer shifter body, a shift actuator movably coupled to the outer shifter body, and an inner shifter body fixed to the steering column, wherein the outer shifter body is configured to rotate about the inner shifter body;
a coupler movable through the outer shifter body between a first coupler position and a second coupler position;
wherein the coupler is configured to couple the outer shifter body to the steering wheel when the coupler is in the first coupler position to permit the shift actuator to rotate along with the steering wheel; and
wherein the coupler is configured to couple the outer shifter body to the steering column when the coupler is in the second coupler position to maintain the outer shifter body stationary relative to the steering wheel.

20. The assembly of claim 19, further comprising an electrical connection assembly configured to transmit electrical signals between the outer shifter body and the inner shifter body.

* * * * *